D. DALE.
RAILWAY SIGNAL SYSTEM.
APPLICATION FILED OCT. 5, 1912.
1,076,552.
Patented Oct. 21, 1913.
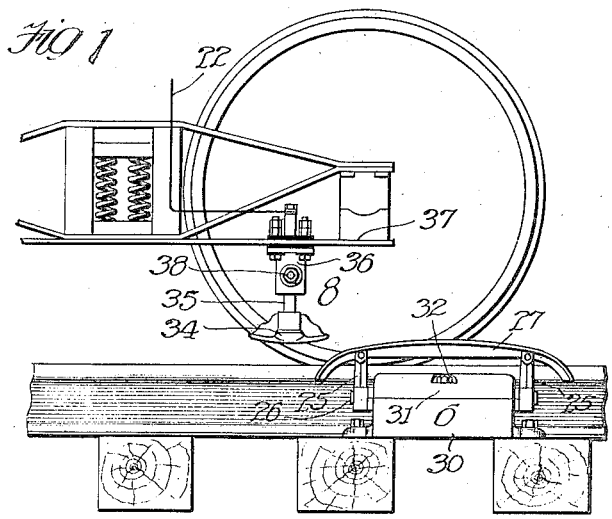
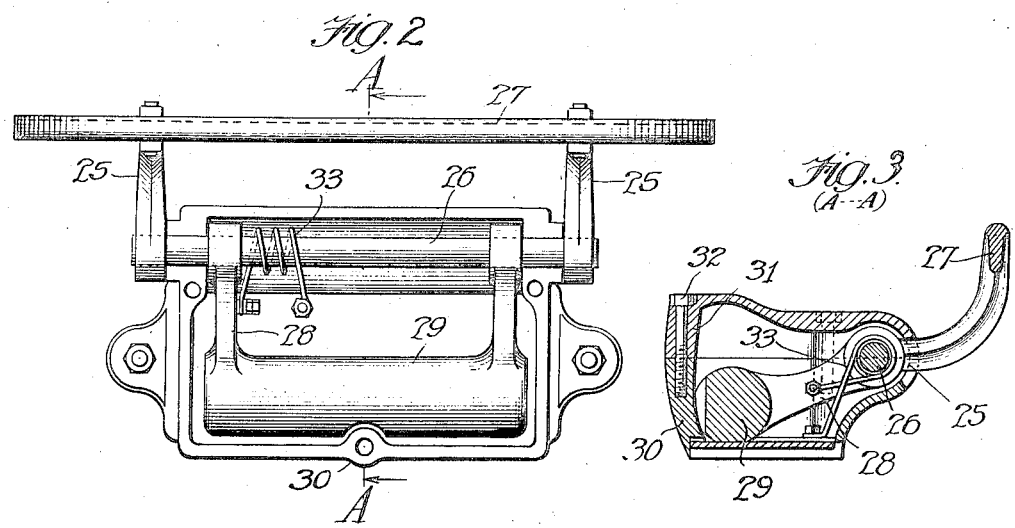
Witnesses
Martin H. Olsen
Edwin Phelps
Inventor
David Dale,
By Rummler & Rummler
Attys.

UNITED STATES PATENT OFFICE.

DAVID DALE, OF CHICAGO, ILLINOIS.

RAILWAY SIGNAL SYSTEM.

1,076,552.  Specification of Letters Patent.  Patented Oct. 21, 1913.

Application filed October 5, 1912. Serial No. 724,079.

*To all whom it may concern:*

Be it known that I, DAVID DALE, a citizen of the United States of America, and a resident of Chicago, county of Cook, State of Illinois, have invented certain new and useful Improvements in Railway Signal Systems, of which the following is a specification.

The main objects of this invention are to provide an improved form of train signaling system adapted to give a signal on the train when it approaches a danger point such as an occupied block, an open switch, a drawbridge, a crossing, or any other signaling point; to provide an improved arrangement of the electrical circuits and mechanism so as to materially reduce the extent and intricacy thereof; and to provide an improved arrangement and construction of the coacting contact members by which the circuit is completed to the signaling means.

An illustrative embodiment of this invention is shown in the accompanying drawings, in which:

Figure 1 is a side elevation of the coacting contact members illustrating their relative positions with respect to the track and the vehicle. Fig. 2 is a plan view of the track contact member, the casing top thereof being removed. Fig. 3 is a transverse sectional view taken on the line A—A of Fig. 1.

In the construction shown in the drawings, the tracks are divided into blocks by means of insulated sections (not shown) interposed between the rails on one side of the track where two blocks meet. The abutting rails in both lines of rails in a block are electrically connected together at the points as usual in signal systems. A contact member 6 is located in each block beside one line of rails intermediate the ends thereof, preferably nearer the end from which the train would be approaching. This member is insulated from its respective block but connected by a conductor (not shown) to the other or opposite line of rails of the succeeding block. This arrangement of the blocks and the electrical connections cause a signaling means, carried by a vehicle traveling along the track, to be operated when the contact member 8, carried by the vehicle, enters into engagement with the contact member 6, provided the preceding block is occupied, in which case the rails on opposite sides of the track in the preceding block would be brought into electrical connection by means of the trucks and thereby complete the circuit. The signaling means (not shown) carried by the vehicle, is preferably in the form of a bell connected to the source of electricity also carried by the vehicle. The apparatus is arranged and connected so as to sound the bell whenever the circuit is closed by said contact member 8 coincident with a circuit closing danger condition established ahead.

The contact member 6 comprises arms 25 secured to the horizontally disposed shaft 26, which is arranged in substantially parallel relation with the line of track. A contact plate or bar 27 is secured to arms 25 and is curved downwardly at its ends so as to provide an inclined approach for the contact shoe 8. A second pair of arms 28 are secured to the shaft 26 inwardly of the arms 25 and extend rearwardly therefrom. A counterweight 29 is integrally formed on the arms 28 and is adapted to yieldingly urge the arms 25 into position to bring the contact plate 27 into the path of the contact shoe 8. The shaft 26, arms 28, and counterweight 29 are housed within a casing comprising a base part 30 by which the member is secured in position at the side of the track, and a top 31 which is secured to the back part by means of bolts 32, the heads of which are seated in sockets so as to make it necessary for one to have a socket wrench in order to remove the bolts. Instead of relying upon the metallic contact of the shaft 26 for electrical connection between the base part 30 and the arms 25, a conductor 33 is coiled around the shaft 26 within the casing and has its ends respectively connected to one of the arms 28 and the base 30.

The contact shoe 8 comprises a contact plate 34 carried on the end of a rod 35 which is held in the block 36 secured to any suitable part of the vehicle, as for instance, the truck bolster 37. The rod 35 is adjustable in the block 36 and is held in any desired position by means of the set screw 38. The rod 35 is, of course, insulated from the truck bolster 37 and has the conductor 22 connected thereto, preferably at its upper end.

The operation of the device shown is as follows: As the vehicle travels along the track the contact shoe 8 successively engages the contact members 6 along the track. The arrangement of the electric circuits is such that a vehicle on the track in the preceding block electrically connects the two lines of rails and thereby shorts the circuit. Thus when a vehicle enters the block at the rear of an occupied block and the contact shoe 8 engages the contact member 6, the said signal apparatus and contact shoe 8 is completed. If the vehicle is approaching a switch which has been opened, the annunciator will operate in a similar manner when such opening results in closing the signal circuit, and the same is true if the circuit is closed by any other means connected with the track in the section ahead of the vehicle.

Although but one specific embodiment of this invention has been herein shown and described, it will be understood that numerous details of the construction shown may be altered or omitted without departing from the spirit of this invention as defined by the following claim.

I claim:

In an electric safety signal system for trains, the combination with a track and a vehicle adapted to travel thereon, of coacting contact members carried on said vehicle and located along said track respectively, said latter contact members each comprising a stationary support, an arm mounted to swing on a horizontal axis thereon, a contact plate carried by said arm, yielding means arranged to coöperate with said arm to hold said plate normally in the path of the contact member carried by the vehicle, and a flexible conductor arranged to electrically connect said arm definitely to the said support at all times.

Signed at Chicago this 1st day of October 1912.

DAVID DALE.

Witnesses:
 RUSSELL C. DALE,
 EUGENE A. RUMMLER.